United States Patent [19]

Matsuzawa et al.

[11] Patent Number: 5,298,113
[45] Date of Patent: Mar. 29, 1994

[54] METHOD OF PRODUCING MAGNETIC HEAD CORE HAVING MAGNETIC GAP AND NARROW TRACK

[75] Inventors: Soichiro Matsuzawa, Kuwana; Yayo Akai, Nagoya, both of Japan

[73] Assignee: NGK Insulators, Ltd., Japan

[21] Appl. No.: 18,436

[22] Filed: Feb. 16, 1993

[30] Foreign Application Priority Data

Feb. 20, 1992 [JP] Japan .................. 4-070229

[51] Int. Cl.$^5$ .................................. B44C 1/22
[52] U.S. Cl. ...................... 156/643; 156/645; 156/654; 156/655; 156/667; 219/121.69; 29/603
[58] Field of Search ............... 156/643, 644, 645, 654, 156/655, 667, 656; 29/603; 360/110, 119–121, 125; 219/121.67, 121.68, 121.69, 121.73, 121.85

[56] References Cited

U.S. PATENT DOCUMENTS

| 4,017,965 | 4/1977 | Brutsch et al. | 29/603 |
| 5,072,322 | 12/1991 | Yasar et al. | 360/103 |

FOREIGN PATENT DOCUMENTS

2167698 8/1973 France.

OTHER PUBLICATIONS

Patent Abstracts of Japan, vol. 16, No. 199 (P-1351) May 13, 1992.
Patent Abstracts of Japan, vol. 9, No. 97 (P-352) Apr. 26, 1985.
Patent Abstracts of Japan, vol. 13, No. 180 (P-864) Apr. 27, 1989.
Patent Abstracts of Japan, vol. 10, No. 210 (P-479) Jul. 23, 1986.

*Primary Examiner*—William Powell
*Attorney, Agent, or Firm*—Parkhurst, Wendel & Rossi

[57] ABSTRACT

A method of producing a magnetic head core having a coil-winding groove around which an annular magnetic path is formed, and a magnetic gap intersecting the magnetic path, and a track having a predetermined track width and extending in a direction perpendicular to the magnetic gap, the magnetic gap and track being formed in a medium-sliding surface of the head core. The method includes the steps of: forming a track precursor in a surface of a core body which gives the medium-sliding surface of the head core, the track precursor having a larger width than a predetermined track width, and extending across the magnetic gap in a longitudinal direction of the core body; and pressing a shearing tool against the track precursor, and applying a force to the shearing tool to thereby remove by shearing at least one of widthwise opposite portions of the track precursor adjacent to the magnetic gap, so as to form the track having a predetermined track width in the vicinity of the magnetic gap.

6 Claims, 9 Drawing Sheets

METHOD OF PRODUCING MAGNETIC HEAD CORE HAVING MAGNETIC GAP AND NARROW TRACK

BACKGROUND OF THE INVENTION

1. Field of the Invention

The present invention relates generally to a method of producing a head core for a magnetic head, and more particularly to a technique for easily forming a track in the head core with high dimensional accuracy, to produce a desired magnetic head.

2. Discussion of the Prior Art

Magnetic heads are conventionally widely used in a video tape recorder (VTR), floppy disk drive (FDD), hard or rigid magnetic disk drive (HDD/RDD) or the like, to effect information recording on and reproduction from a magnetic recording medium such as a magnetic tape or magnetic disk. As known in the art, the magnetic head has a head core formed of a magnetic material such as ferrite. The head core has a coil-winding groove around which an annular or closed magnetic path is formed, and a magnetic gap having a suitable minute spacing for writing or reading information on or from a magnetic recording medium. The magnetic gap is formed in a medium-sliding surface (magnetic disc sliding surface) of the head core which is to be opposed to the recording medium and on which the recording medium slides in operation, such that the magnetic gap intersects the annular magnetic path. The head core is also formed at its medium-sliding surface with a track whose width determines the width of the magnetic gap, such that the track extends across the magnetic gap, in a sliding or running direction of the recording medium relative to the head core.

The magnetic head core used for VTR, FDD or the like is conventionally fabricated in the following manner. Referring first to FIG. 1, a pair of ferrite blocks (core bars) 2, 4 are ground by a dicing cutter, for example, using a diamond blade or grinding stone, so that beveled grooves 6 for defining the width of tracks are formed in the ferrite blocks 2, 4. Then, the grooves 6 are filled with glass fillers 8, and the opposed surfaces 10 of the ferrite blocks 2, 4 which cooperate to define magnetic gaps are ground. Thereafter, the ferrite blocks 2, 4 are joined together with a gap spacer interposed therebetween, to provide a ferrite bar having a magnetic gap 12 whose size is determined by the spacer. The ferrite bar is then cut into core chips (16), one of which is shown in FIG. 1. The thus obtained head core 16 has a track 14 defined by the opposite grooves 6, 6, and a coil-winding groove 15 around which an annular or closed magnetic path is formed.

The above-described known method of producing the head core requires cumbersome process steps for forming the track 14. To control the width of the track 14 to about 20 $\mu$m with an accuracy of $\pm 1$ $\mu$m, for use with a VTR, for example, the beveled grooves 6 for defining the track width need to be formed by machining with an extremely high accuracy, using expensive precision machine tools. While the two ferrite blocks 2, 4 are to be butted and bonded together to form the track 14 having a target width "Tw", as shown in FIG. 2(a), this target width "Tw" may not be actually achieved due to a slight positional deviation or misalignment of the butted ferrite blocks 2, 4, as shown in FIG. 2(b) wherein the track 14 has a width of "Tw'" which is smaller than the target value "Tw".

To produce a magnetic head core used for HDD, on the other hand, a core slider body 20 having a suitable magnetic gap 18 is first prepared, as shown in FIG. 3, and two grooves 22 are then formed in the slider body 20 by grinding, so that a track portion 24 having beveled side faces and two air bearing portions 26 are formed on the slider body 20. Then, the beveled side faces of the track portion 24 are subjected to a grinding operation using a cup-shaped grinding wheel 28, so as to form a track 30 having a desired track width of "Tw", as shown in FIGS. 4(a)–4(c). The air bearing portions 26 are ground in a similar manner, to form air bearing surfaces 27, 27 on the opposite sides of the track 30. The thus ground slider body 20 is further processed to form a head core portion having the gap 18 and a chamfered leading ramp, so as to provide a core slider 31 (FIG. 3) having the integrally formed head core portion and slider portion with the air bearing surfaces 27.

In the thus produced core slider 31, the accuracy of the width of the track 30 is at its best kept to about $\pm 1$ $\mu$m. Even this accuracy is extremely difficult to be guaranteed in the mass production of this type of core slider. Further, it becomes increasingly difficult to provide a sufficiently narrow track whose width is 10 $\mu$m or smaller and has an accuracy of $\pm 10\%$, so as to meet the recent requirement for high-density recording on a magnetic recording medium.

In the magnetic head cores as described above, the relatively narrow track 14, 30 is only required to extend over a length enough to cover the region adjacent to the magnetic gap 12, 18, i.e., the ferrite portions defining the gap 12, 18. According to the above known method, however, the narrow track 14, 18 extends over an unnecessarily large length to cover not only the region adjacent to the magnetic gap 12, 18 but also ferrite portions on the longitudinally opposite sides of the region, whereby magnetic saturation tends to occur upon formation of a magnetic field, rendering the resulting magnetic head unsatisfactory in terms of operating efficiency.

SUMMARY OF THE INVENTION

It is therefore an object of the present invention to provide a method of producing a magnetic head core with an annular magnetic path, wherein a sufficiently narrow track whose width determines the width of a magnetic gap can be easily formed with significantly improved accuracy.

The above object may be attained according to the principle of the present invention, which provides a method of producing a magnetic head core for use with a magnetic recording medium, the magnetic head core having a coil-winding groove around which an annular magnetic path is formed, and a magnetic gap and a track formed in a medium-sliding surface of the head core which is to be opposed to the magnetic recording medium, the magnetic gap intersecting the magnetic path, the track having a predetermined track width and extending in a direction perpendicular to the magnetic gap, comprising the steps of: forming a track precursor in a surface of a core body which gives the medium-sliding surface of the head core, the track precursor having a width which is larger than the predetermined track width, and extending across the magnetic gap in a longitudinal direction of the core body; and pressing a shearing tool against the track precursor, and applying a force to the shearing tool to thereby remove by shearing at least one of widthwise opposite portions of the track precursor adjacent to the magnetic gap, so as to form the track having the predetermined track width in the vicinity of the magnetic gap.

According to the above-described method according to the present invention, the shearing for determining the final track width is conducted on the track precursor having a larger width than the predetermined track width. The shearing used herein is equivalent to a punching action of a punching tool. The present method thus eliminates the conventional grooving process for forming two individual grooves in two core members with high accuracy, before assembling the core members into a core body. Since the track can be formed in the core body to extend over the two core members at a time, according to the present method, these core members do not need to be positioned relative to each other with high accuracy. Further, the present method permits a significantly narrow effective track to be formed in the very vicinity of the magnetic gap, without causing undesirable leakage of magnetic flux from the ferrite portions other than the track, thereby rendering the obtained magnetic head core excellent in operating efficiency.

In addition, the formation of the track according to the present method may be accomplished by a considerably simple and compact apparatus, which is only required to force a cutting edge of the shearing tool against a track precursor, and remove a portion or portions of the track precursor. Such apparatus may be easily used in combination with a microscope. Accordingly, a sufficiently narrow track can be easily formed at a reduced cost, with high accuracy.

According to a preferred feature of the present invention, the track precursor is formed by a method selected from the group consisting of machining, laser beam machining and laser-induced etching.

According to another feature of the present invention, the shearing tool has a cutting edge having a straight portion which intersects the magnetic gap at substantially right angles, and two inclined portions which extend outward from respective opposite ends of the straight portion, as viewed in a direction in which the shearing tool is pressed against the track precursor. Alternatively, the shearing tool may have a cutting edge having an arcuate portion which intersects the magnetic gap at its top end, and two inclined portions which extend outward from respective opposite ends of the arcuate portion, as viewed in the above-indicated direction.

To perform the cutting operation on the track precursor with high efficiency, it is desirable that the shearing tool is fixedly supported by a pivotable shaft, so that the shearing tool is movable in a direction of extension of the magnetic gap when the force is applied to the shearing tool with a cutting edge thereof being in contact with the track precursor. For the same purpose, the shearing tool or core body may receive ultrasonic vibrations during the cutting operation.

BRIEF DESCRIPTION OF THE DRAWINGS

The above and optional objects, features and advantages of the present invention will be better understood by reading the following detailed description o a presently preferred embodiment of the invention, when considered in connection with the accompanying drawings, in which:

FIG. 2(a) showing a track having a nominal width "Tw" while FIG. 2(b) showing a track whose width "Tw'" is smaller than the nominal width;

FIGS. 4(a)–4(c) are views showing process steps for forming a track in the head core of FIG. 3, wherein FIG. 4(a) shows in cross section a contour of a pre-track portion from which a track is formed, FIG. 4(b) shows a grinding operation effected on the pre-track portion by means of a grinding wheel, and FIG. 4(c) shows in cross section a contour of the track formed by the grinding operation;

FIGS. 5(a)–5(e) are perspective views each showing a core body on which the cutting operation according to the present invention is to be effected, wherein FIG. 5(a) shows the core body prior to formation of a track precursor, and FIG. 5(b)–5(e) show various forms of track precursors formed by various methods in the respective core bodies;

FIGS. 7(a)–7(d) are views showing the track precursor from which at least one of widthwise opposite side portions is removed by the cutting tool, wherein FIGS. 7(a) and 7(b) are a cross sectional view and a plan view, respectively, of the track precursor one side portion of which is removed, while FIGS. 7(c) and 7(d) are a cross sectional view and a plan view, respectively, of the track precursor the opposite side portions of which are removed;

FIGS. 8(a)–8(d) are plan views of cutting tools used for forming tracks according to the invention, and of top surfaces of the core bodies which are processed by using the cutting tools, wherein FIGS. 8(a) and 8(c) show different forms of cutting edges of the cutting tools used according to the invention, and FIGS. 8(b) and 8(d) show different forms of tracks formed by the cutting tools of FIGS. 8(a) and 8(c), respectively;

DETAILED DESCRIPTION OF THE PREFERRED EMBODIMENT

The magnetic head core produced according to the present invention is generally formed of a selected one of various known magnetic materials including metallic magnetic materials and oxide magnetic bodies. Of these materials, a ferrite material such as Mn-Zn ferrite or Ni-Zn ferrite is preferably used depending upon a specific application of the head core.

Figure 3:
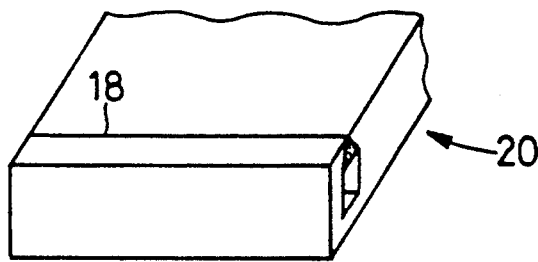
FIG. 3 is a series of views showing a process of producing a known monolithic type magnetic head core for HDD.
Figure 3:
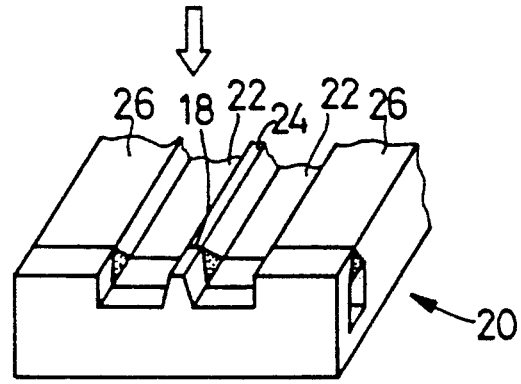
Figure 3:
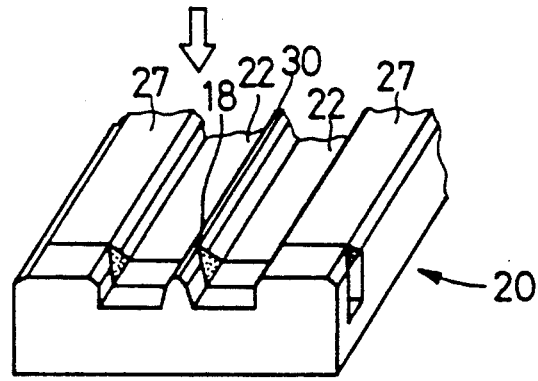
Figure 3:
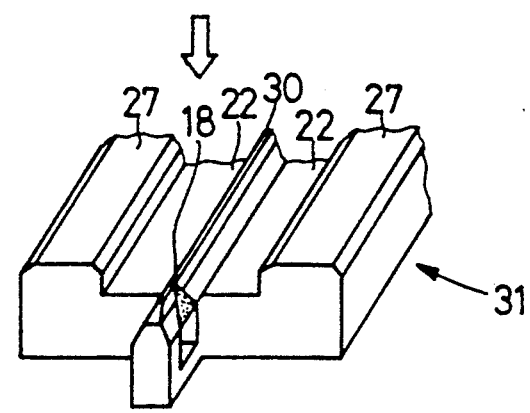
Figure 5A:
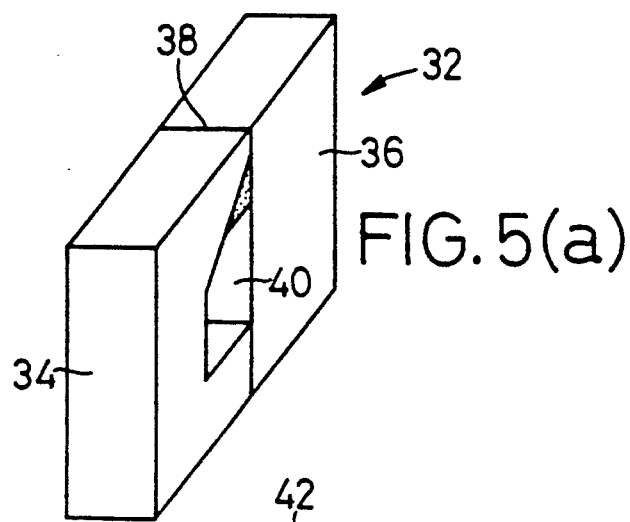

By using the selected magnetic material, there may be formed a core body or core chip 32 as illustrated in FIG. 5(a), to provide a magnetic head core for use with VTR or FDD, or a composite-type head core for use with HDD, or may be formed a core slider body 20 as illustrated in FIG. 3, which includes a slider portion with air bearing surfaces, to provide a monolithic type head core for use with HDD.

Figure 1:
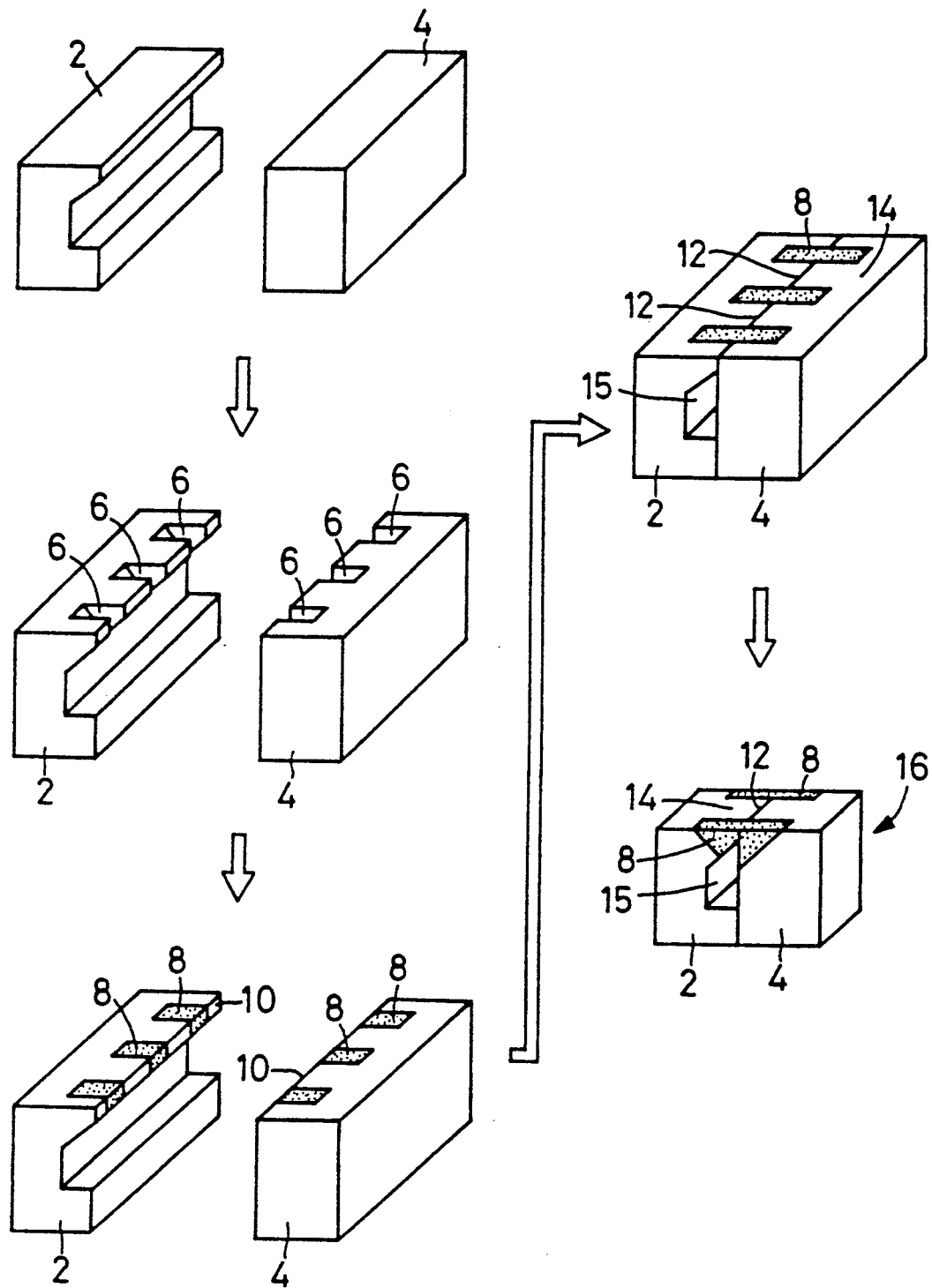
FIG. 1 is a series of views showing a process of producing a known magnetic head core for VTR or FDD, for example.
Figure 2A:
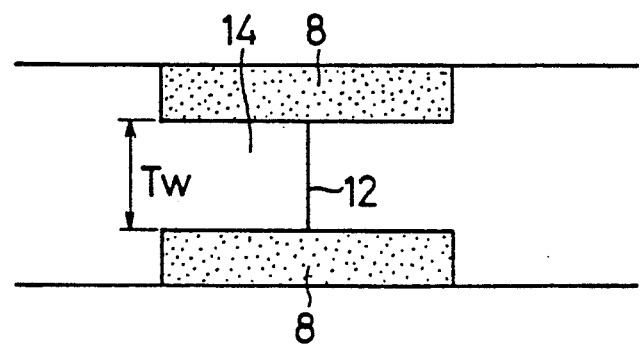
FIGS. 2(a) and 2(b) are fragmentary enlarged plan views each showing a magnetic gap and its adjacent portions of the magnetic head core of FIG. 1.
Figure 2B:
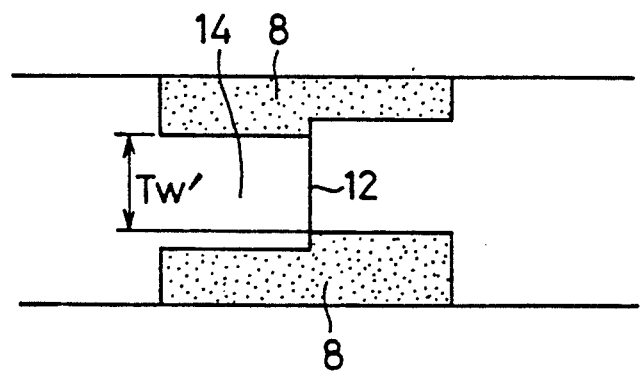

More specifically, the core body 32 as shown in FIG. 5(a) substantially consists of a U-shaped core member 34 and an I-shaped core member 36 which are both formed of ferrite, for example. These core members 34, 36 are joined together with a suitable minute spacing of magnetic gap 38 formed therebetween. A coil-winding groove 40 is also formed between the core members 34, 36, whereby an annular or closed magnetic path is formed around the groove 40, such that the magnetic gap 38 intersects the magnetic path at substantially right angles. As known in the art, the core bodies 32 of this type may be easily prepared by slicing a so-called gap bar, i.e., a joined body of the ferrite blocks 2, 4 as shown in FIG. 1, into core chips.

Figure 5B:
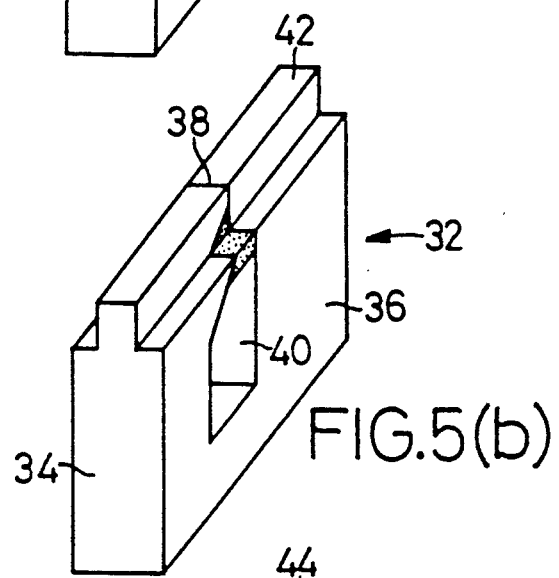
Figure 5C:
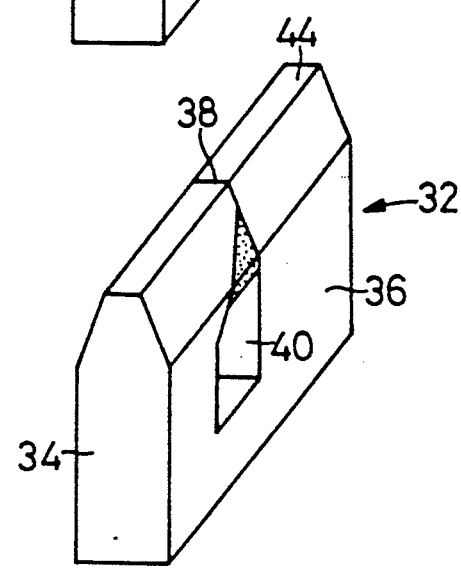
Figure 5D:
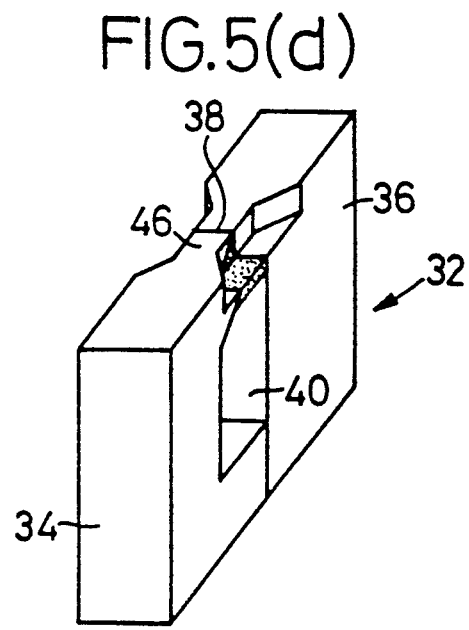
Figure 5E:
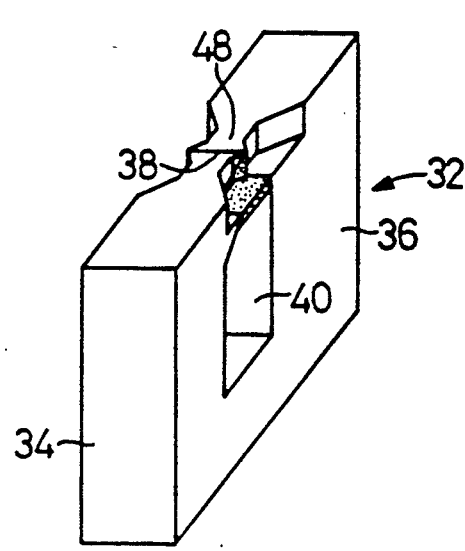

Subsequently, the core body 32 is formed at its top surface with a track precursor having a larger width than a target or nominal track width, such that the track precursor extends across the magnetic gap 38 in the longitudinal direction of the core body 32. In operation, a suitable magnetic recording medium slides on the top surface of the core body 32 which is opposed to the recording medium. FIGS. 5(b) through 5(e) illustrate various forms of track precursor formed in the core body 32. To form track precursors 42, 44 as shown in FIGS. 5(b) and 5(c), the top surface of the core body 32 is ground by a grinding wheel, so as to remove or chamfer the laterally opposite edges of the top surface which extend in the longitudinal direction. The track precursor 42 of FIG. 5(b) has substantially vertical side surfaces which are parallel to the opposite side surfaces of the core body 32, while the track precursor 44 of FIG. 5(c) has beveled side surfaces which connect the top surface and opposite side surfaces of the core body 32. To form a track precursor 46 as shown in FIG. 5(d), the core body 32 is processed by laser beam machining or laser-induced etching, so that the track precursor 46 is formed only in the vicinity of the magnetic gap 38. Alternatively, the core body 32 is chemically etched by photolithography, so that a track precursor 48 is formed only in the vicinity of the magnetic gap 38, as shown in FIG. 5(e). In the latter case, the track precursor 48 has an intermediate gap-defining portion which defines the magnetic gap 38 filled with a protective glass, and therefore has a larger width than the other portions of the track precursor 48 as a result of the chemical etching operation. While a desired track precursor (42, 44, 46, 48) may be formed by any of the above-described methods, such track precursor may be suitably formed by any other known processing method according to the present invention.

Figure 4A:
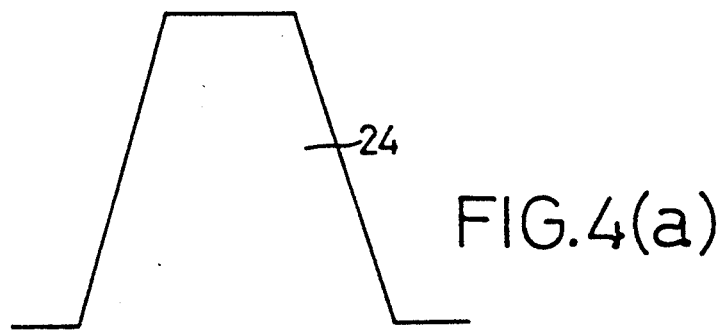
Figure 4B:
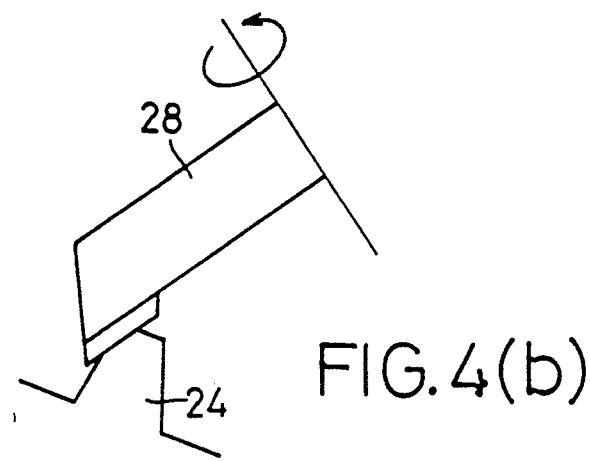
Figure 4C:
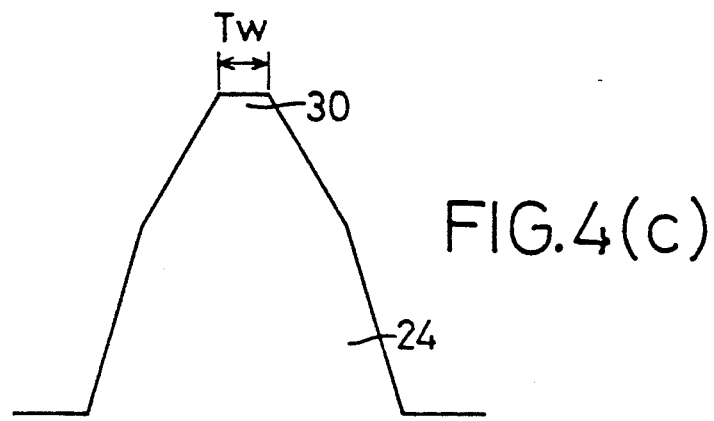

In the case of a monolithic-type magnetic head core used for HDD, e.g., the above-indicated monolithic type core slider 31 as shown in FIG. 3, the pre-track portion 24 and air bearing portions 26 are concurrently formed by machining or other method as described above, in the top surface of the core slider body 20 which is to be opposed to magnetic recording media in use. Thus, there is formed a track precursor which has the same cross sectional shape as the pre-track portion 24 shown in FIG. 4(a).

According to the method of the present invention, a cutting tool or shearing tool made of diamond or the like is pressed against the thus formed track precursor, and a force is applied to the cutting tool to remove by shearing at least one of widthwise or laterally opposite parts of a gap-defining portion (defining the magnetic gap 38) of the track precursor, so as to form an effective track having a target or final track width.

Figure 6A:
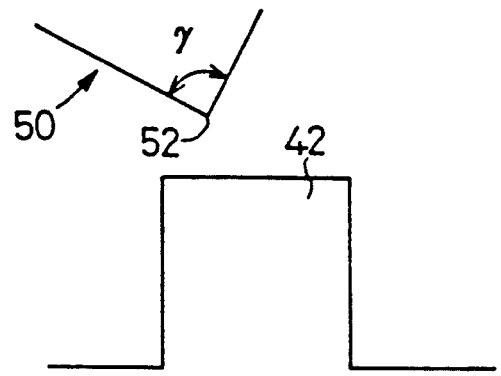
FIG. 6(a)–6(c) are a series of views which explain the cutting operation conducted on the track precursor of FIG. 5(b) by a cutting tool.
Figure 6B:
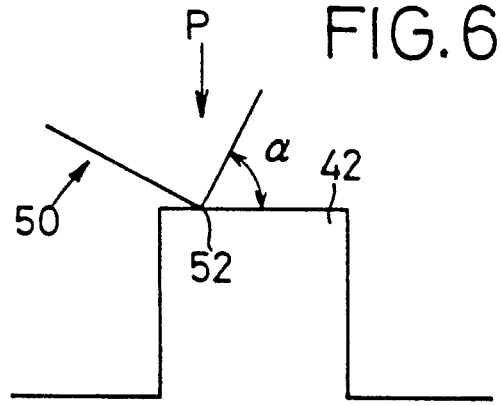
Figure 6C:
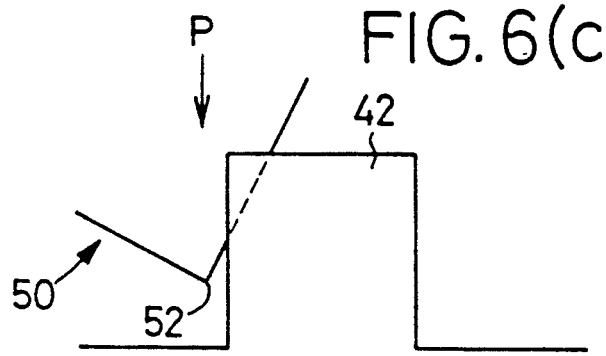
Figure 7A:
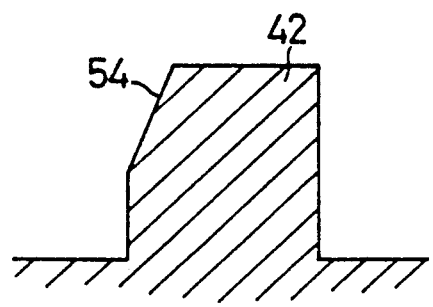
Figure 7B:
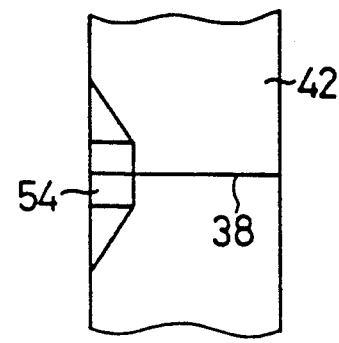
Figure 7C:
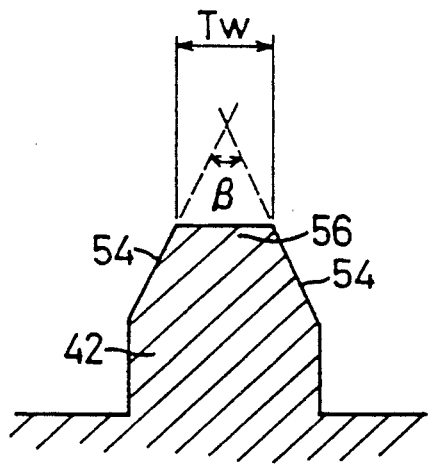
Figure 7D:
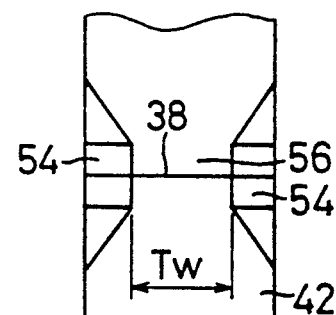

Referring to FIGS. 6(a)–6(c) which show the track precursor 42 formed as shown in FIG. 5(b), an example of the above process of forming the track will be described. According to this process, a part of the track precursor 42 is removed by shearing or punching, using a cutting tool 50 made of a diamond or other hard material. More specifically, a cutting edge 52 of the cutting tool 50 is pressed against the top surface of the track precursor 42 (which is to be opposed to magnetic recording media), and a given amount of force "P" is then applied to the cutting tool 50. This cutting step may be repeated several times, as needed, so as to form a cutout or cutouts 54 for determining the final width of the track, as shown in FIGS. 7(a) through 7(d). Each cutout 54 is formed in a depth enough to reach the coil-winding groove 40, whereby the depth of the magnetic gap 38 is determined. In FIGS. 7(c) and 7(d), two cutouts 54 are formed by the cutting tool 50, at the widthwise or laterally opposite portions of the track precursor 42 on the right and left sides of the magnetic gap 38, so as to provide an effective track 56 having a predetermined width "Tw".

The cutting operation for determining the track width "Tw" is not necessarily effected with respect to the widthwise opposite portions of the track precursor. In the case of the tapered track precursor 44 as shown in FIG. 5(c) or relatively narrow track precursor 46 as shown in FIG. 5(d), for example, only one cutout may be formed in one of the opposite portions of the track 44, 46, to determine the final width of the effective track.

Figure 8A:
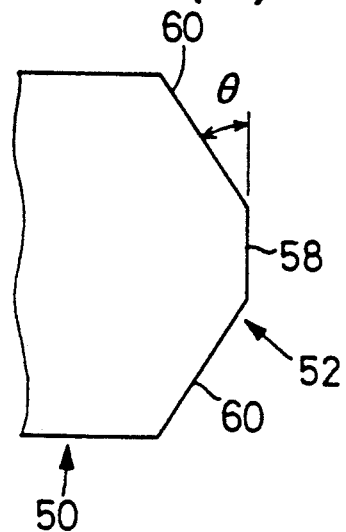
Figure 8B:
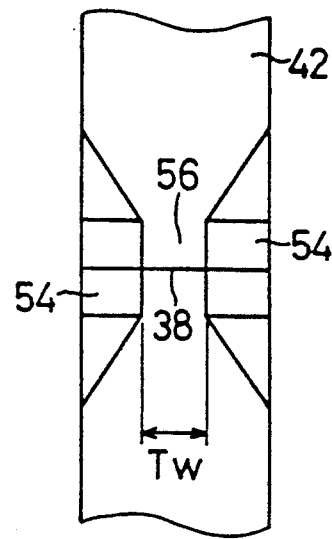

In order to enhance the operating efficiency of the magnetic head, it is believed effective to narrow only a gap-defining ferrite portion in the very vicinity of the magnetic gap, thereby preventing the magnetic flux from leaking from the other ferrite portions. To this end, the cutting edge 52 of the cutting tool 50 forms a trapezoidal shape as shown in FIG. 8(a), as viewed in a direction in which the cutting tool 50 is pressed against the track precursor 42, i.e., as viewed in a direction perpendicular to the medium-sliding or top surface of the core body. Namely, the cutting edge 52 includes an intermediate straight portion 58 which intersects the magnetic gap 38 at substantially right angles, and two inclined portions 60, 60 which extend outward (toward a side face of the track precursor 42) from the respective opposite ends of the straight portion 58, to form a given angle "θ" with respect to an extension line of the straight portion 58. By use of this cutting tool 50, a comparatively narrow track 56 can be effectively formed in the vicinity of the magnetic gap 38, as shown in FIG. 8(b). In this regard, the length of the straight portion 58 of the cutting edge 52 is desirably minimized as far as possible, so that the track 56 is limited to the gap-defining portion adjacent to the magnetic gap 38 The above-indicated angle "θ" formed by the portions 58, 60 of the edge 52 is generally selected within a range of 30°~60°.

Figure 8C:
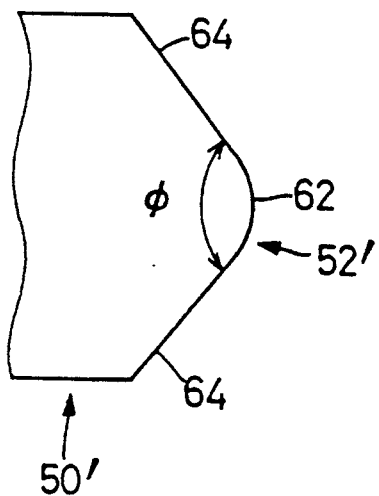
Figure 8D:
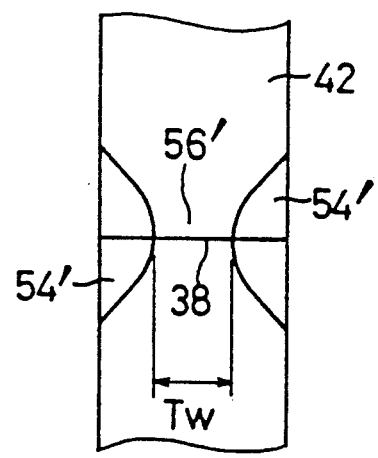

The cutting tool 50 with the cutting edge 52 having the trapezoidal shape as shown in FIG. 8(a) may be replaced by a cutting tool 50' with a cutting edge 52' having an arcuate tip as shown in FIG. 8(c). Namely, the cutting edge 52' of the cutting tool 50' as viewed in the above-indicated direction includes an arcuate portion 62 which intersects the magnetic gap 38 at its top end, and two inclined portions 64 which extend outward (toward a side face of the track precursor 42) from the respective opposite ends of the arcuate portion 62. By use of this cutting tool 50', a comparatively narrow track 56' is formed only in the vicinity of the magnetic gap 38, as shown in FIG. 8(d), such that the width of the track 56' is particularly reduced at its gap-defining portion adjacent to the gap 38. As shown in FIG. 8(c), the two inclined portions 64, 64 of the cutting edge 52' form an angle of "φ" which is generally selected within a range of about 60°~120°.

In order to enhance the operating efficiency of the magnetic head, it is also considered desirable to vary the width of the track 56 in the vertical direction (i.e., the direction of depth of the magnetic gap 38), such that the track 56 is tapered from its lower portion (on the side of the coil-winding groove) toward the top surface or medium-sliding surface thereof, as shown in FIG. 7(c). To this end, the inner surface of the cutting tool 50 which provides the cutting edge 52, that is, the surface which determines the track width, is inclined by a given angle of "α" with respect to the top surface of the track precursor 42, as shown in FIG. 6. Further, it is desirable that the cutting edge 52 of the cutting tool 50 is movable or escapable outwards, i.e., toward the side surface of the track precursor 42, when a force is applied to the cutting tool 50 during the cutting operation for forming the track. The above-indicated angle "α", which depends on the angle "γ" of the cutting edge 52 and the force "P" acting on the cutting tool 50, is generally selected within a range of 45°~90°. The angle "γ" (FIG. 6) of the cutting edge 52 of the cutting tool 50 and the taper angle "β" (FIG. 7(c)) of the track 56 formed are both desirably selected within a range of 60°~90°. Further, the force "P" of 100 g suffices to accomplish the cutting operation. If the force "P" exceeds 200 g, the cutting tool may strike the bottom wall defining the track precursor 42 during the cutting operation, causing cracks or damages in the head core.

Figure 9:
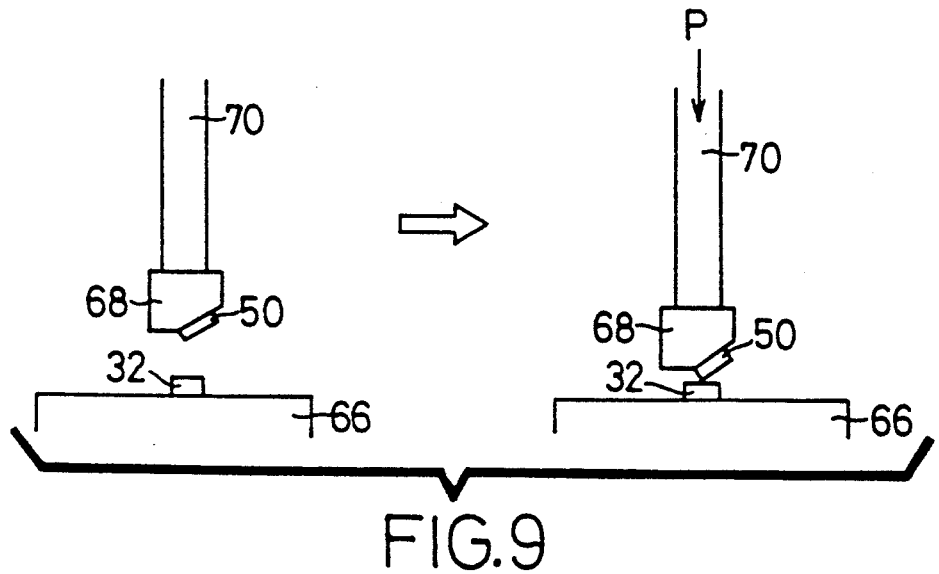
FIG. 9 is a view explaining a cutting operation conducted on the core body with a cutting tool supported by a shaft.
Figure 10:
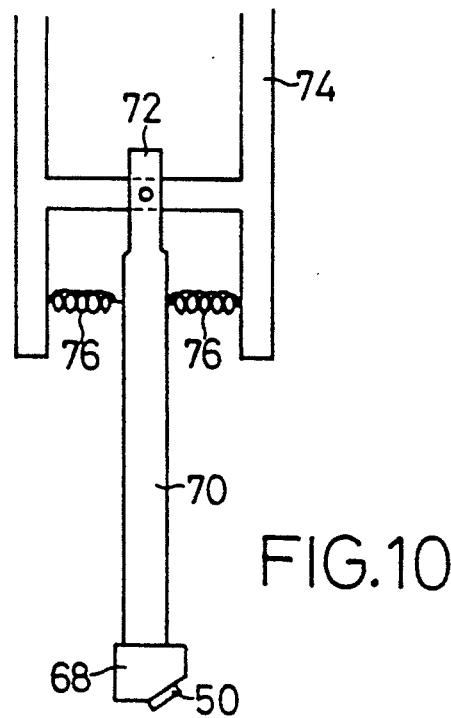
FIG. 10 is a view illustrating an example of a structure for supporting the shaft to which the cutting tool is fixed, which structure is favorably employed to perform the cutting operation as shown in FIG. 9.

To perform the cutting operation for forming the track according to the present invention, the core body 32 is fixed on a stationary base 66 while the cutting tool 50 is held by a holder 68 which is fixed to a shaft 70, as generally shown in FIG. 9. Then, a given amount of force "P" is applied to the cutting tool 50 through the shaft 70, so that a cutting edge of the cutting tool 50 is pressed against the track precursor 42 of the core body 32, so as to remove a redundant portion of the track precursor. Upon application of the pressing force to the cutting tool 50 during this cutting operation, the cutting edge 52 of the tool 50 is adapted to move in the lateral direction, i.e., in a direction of extension of the magnetic gap, as well as in the vertical direction, to escape outwards (leftwards in FIG. 6), i.e., toward the side face of the track precursor 42. To this end, the shaft 70 is hung from a pressing device 74 such that the shaft 70 is pivotable about its proximal portion 72 relative to the device 74, and such that the cutting tool 50 is fixed to the distal end of the shaft 70 remote from the pressing device 74, as shown in FIG. 10. Further, springs 76, 76 are provided between the proximal portion 72 and the pressing device 74 so as to bias the shaft 70 in the directions of pivotal movement of the shaft 70.

While the cutting operation on the track precursor is carried out by the apparatus as shown in FIG. 10, with the downward force P being applied from the pressing device 74 to the cutting tool 50 through the shaft 70, the shaft 70 pivots in the clockwise direction about the proximal portion 72 connected to the device 74, under the biasing force of one of the springs 76, whereby the cutting tool 50 is allowed to escape leftwards as viewed in FIG. 10. When the pressing device 74 ceases to apply the force P to the cutting tool 50, the shaft 70 supporting the tool 50 is lifted up, and is restored, under the biasing force of the other spring 76, to the original position where the two springs 76, 76 are balanced, in preparation for the next cutting operation.

In practicing the present invention, it is also desirable to apply ultrasonic vibrations to the shaft 70 supporting the cutting tool 50 or the stationary base 66 supporting the core body 32 as seen in FIG. 9, so as to enhance the working efficiency in cutting the track precursor, and smooth the cut surface of the track obtained.

The core body which has been formed with a track with high accuracy by means of the above-described cutting tool may be further processed as needed in the known manner, to provide a desired head core used in a magnetic head for VTR, FDD, HDD or the like.

While the method of producing a magnetic head core according to the present invention has been described in the presently preferred embodiment, it is to be understood that the invention is not limited to the details of the illustrated embodiment, but may be embodied with various changes, modifications and improvements, which may occur to those skilled in the art without departing from the scope of the invention.

Although the method of producing the magnetic head cores used mainly for VTR or FDD, for example, has been described in the illustrated embodiment, the method of the present invention may be equally advantageously employed for producing other magnetic head cores, such as a monolithic-type head core (core slider) for HDD.

In the illustrated embodiment, each of the core bodies or core chips obtained from the gap bar is processed in two steps to form a track precursor and then form an effective track by the cutting tool. However, the two process steps may be effected on the gap bar before it is cut into core chips, and the thus processed gap bar is then cut into a plurality of magnetic head cores. Namely, the gap bar obtained by joining the ferrite blocks 2, 4 as shown in FIG. 1 may be formed with the track precursor and then with the track by the cutting tool, and is subsequently cut into a plurality of core chips which provide individual magnetic head cores.

What is claimed is:

1. A method of producing a magnetic head core for use with a magnetic recording medium, the magnetic head core having a coil-winding groove around which an annular magnetic path is formed, and a magnetic gap and a track formed in a medium-sliding surface of the head core which is to be opposed to the magnetic recording medium, said magnetic gap intersecting said magnetic path, said track having a predetermined track width and extending in a direction perpendicular to said magnetic gap, comprising the steps of:

forming a track precursor in a surface of a core body which gives said medium-sliding surface of the head core, said track precursor having a width which is larger than said predetermined track width, and extending across said magnetic gap in a longitudinal direction of the core body; and pressing a shearing tool against said track precursor, and applying a force to the shearing tool to thereby remove by shearing at least one of widthwise opposite portions of the track precursor adjacent to said magnetic gap, so as to form said track having the predetermined track width in the vicinity of said magnetic gap.

2. A method of producing a magnetic head core according to claim 1, wherein said track precursor is formed by a method selected from the group consisting of machining, laser beam machining and laser-induced etching.

3. A method of producing a magnetic head core according to claim 1, wherein said shearing tool has a cutting edge having a straight portion which intersects said magnetic gap at substantially right angles, and two inclined portions which extend outward from respective opposite ends of said straight portion, as viewed in a direction in which said shearing tool is pressed against said track precursor.

4. A method of producing a magnetic head core according to claim 1, wherein said shearing tool has a cutting edge having an arcuate portion which intersects said magnetic gap at its top end, and two inclined portions which extend outward from respective opposite ends of said arcuate portion, as viewed in a direction in which said shearing tool is pressed against said track precursor.

5. A method of producing a magnetic head core according to claim 1, wherein said shearing tool is fixedly supported by a pivotable shaft, so that the shearing tool is movable in a direction of extension of said magnetic gap when the force is applied to said shearing tool with a cutting edge thereof being in contact with said track precursor.

6. A method of producing a magnetic head core according to claim 1, wherein said shearing tool or said core body receives ultrasonic vibrations while said at least one of widthwise opposite portions of said track precursor is removed by the shearing tool.

* * * * *